(12) United States Patent
Anger et al.

(10) Patent No.: US 8,459,594 B2
(45) Date of Patent: Jun. 11, 2013

(54) EMERGENCY EVACUATION SYSTEM, IN PARTICULAR FOR A TAILLESS AEROPLANE

(75) Inventors: André Anger, Hamburg (DE); Wolfram Schöne, Buxtehude (DE)

(73) Assignee: Airbus Operations GmbH (DE)

( * ) Notice: Subject to any disclaimer, the term of this patent is extended or adjusted under 35 U.S.C. 154(b) by 763 days.

(21) Appl. No.: 11/992,274

(22) PCT Filed: Sep. 14, 2006

(86) PCT No.: PCT/EP2006/008978
§ 371 (c)(1),
(2), (4) Date: Sep. 10, 2009

(87) PCT Pub. No.: WO2007/031320
PCT Pub. Date: Mar. 22, 2007

(65) Prior Publication Data
US 2010/0243814 A1  Sep. 30, 2010

(30) Foreign Application Priority Data
Sep. 17, 2005  (DE) .......... 10 2005 044 535

(51) Int. Cl.
*B64C 1/22* (2006.01)
(52) U.S. Cl.
USPC .............. 244/137.2; 244/137.1; 244/118.5
(58) Field of Classification Search
USPC .......... 244/118.3, 118.5, 129.5, 129.6, 137.1, 244/137.2, 905
See application file for complete search history.

(56) References Cited

U.S. PATENT DOCUMENTS

| | | | | |
|---|---|---|---|---|
| 298,212 A | * | 5/1884 | Knight | 182/1 |
| 1,419,834 A | * | 6/1922 | Fellows | 182/1 |
| 2,547,811 A | * | 4/1951 | Burnelli | 244/118.3 |
| 2,942,812 A | | 6/1960 | Pauli | |

(Continued)

FOREIGN PATENT DOCUMENTS

| CN | 2 103 347 U | 5/1992 |
|---|---|---|
| DE | 197 57 025 A1 | 7/1999 |

(Continued)

OTHER PUBLICATIONS

Office Action from Russian Application No. 2008114710/11, dated Oct. 19, 2010.

(Continued)

*Primary Examiner* — Tien Dinh
*Assistant Examiner* — Justin Benedik
(74) *Attorney, Agent, or Firm* — Lerner, David, Littenberg, Krumholz & Mentlik, LLP

(57) ABSTRACT

A device for selective emergency evacuation of persons from a first level to a second level situated above the first level, or to a third level situated below the first level. For evacuation to the second level a stair arrangement is provided. One end of the device is connected to the first level while the other end is displaceable between the second level and the third level or vice versa. For evacuation to the third level, the device is changeable to a slide. The device may provide for emergency evacuation of persons from a first level deck, or passenger deck of a blended wing-body aircraft, selectively to the top, second level of the aircraft, or to the bottom third level of the aircraft.

20 Claims, 6 Drawing Sheets

U.S. PATENT DOCUMENTS

Figure 1:
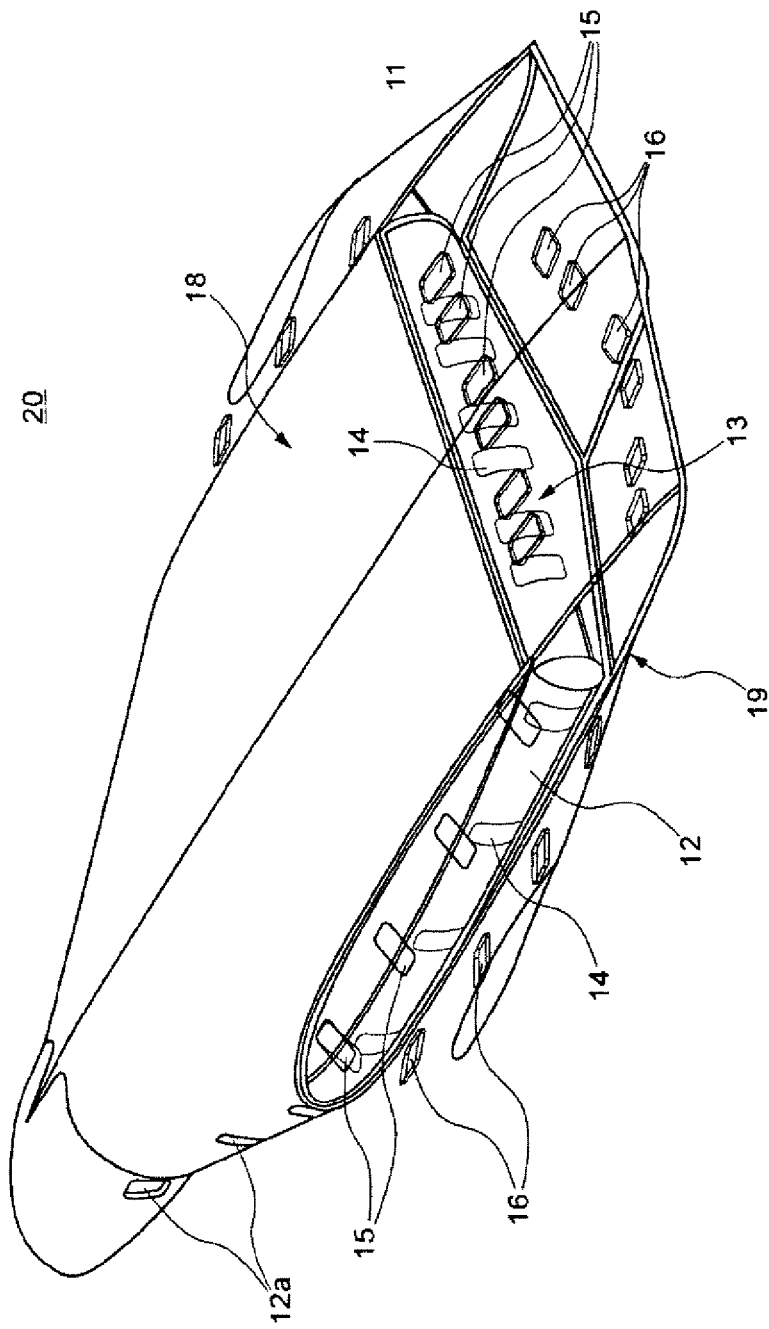

| | | | |
|---|---|---|---|
| 2,942,816 A * | 6/1960 | Dostie | 244/137.2 |
| 3,339,690 A | 9/1967 | Graig | |
| 3,731,761 A * | 5/1973 | Glenn | 182/1 |
| 5,634,440 A * | 6/1997 | Mogck | 119/847 |
| 5,794,292 A * | 8/1998 | Ricci, Jr. | 14/69.5 |
| 5,893,535 A | 4/1999 | Hawley | |
| 6,189,653 B1 * | 2/2001 | Laug | 182/152 |
| 6,382,562 B1 * | 5/2002 | Whitlock et al. | 244/118.3 |
| 6,595,466 B2 * | 7/2003 | Depeige et al. | 244/118.3 |
| 6,986,485 B2 * | 1/2006 | Farnsworth | 244/118.5 |
| 7,159,261 B2 * | 1/2007 | Carrigan | 14/71.1 |
| 7,621,236 B2 * | 11/2009 | Steffey et al. | 119/847 |
| 2002/0063187 A1 * | 5/2002 | Depeige et al. | 244/137.2 |
| 2005/0235437 A1 * | 10/2005 | Carrigan | 14/69.5 |
| 2006/0006023 A1 * | 1/2006 | Lim | 182/127 |
| 2007/0101516 A1 * | 5/2007 | Carrigan | 14/69.5 |

FOREIGN PATENT DOCUMENTS

| | | |
|---|---|---|
| EP | 1 032 746 A1 | 9/2000 |
| EP | 1 099 626 A1 | 5/2001 |
| EP | 1 209 077 A1 | 5/2002 |
| JP | 2002193191 A | 7/2002 |
| RU | 2160210 C1 | 12/2000 |
| RU | 2193505 C2 | 11/2002 |

OTHER PUBLICATIONS

Office Action from Japanese Application No. 2008-530416, dated Oct. 11, 2011. (English translation of summary).

International Serach Report issued on Dec. 27, 2006 in connection with corresponding International Application No. PCT/EP2006/008978.

\* cited by examiner

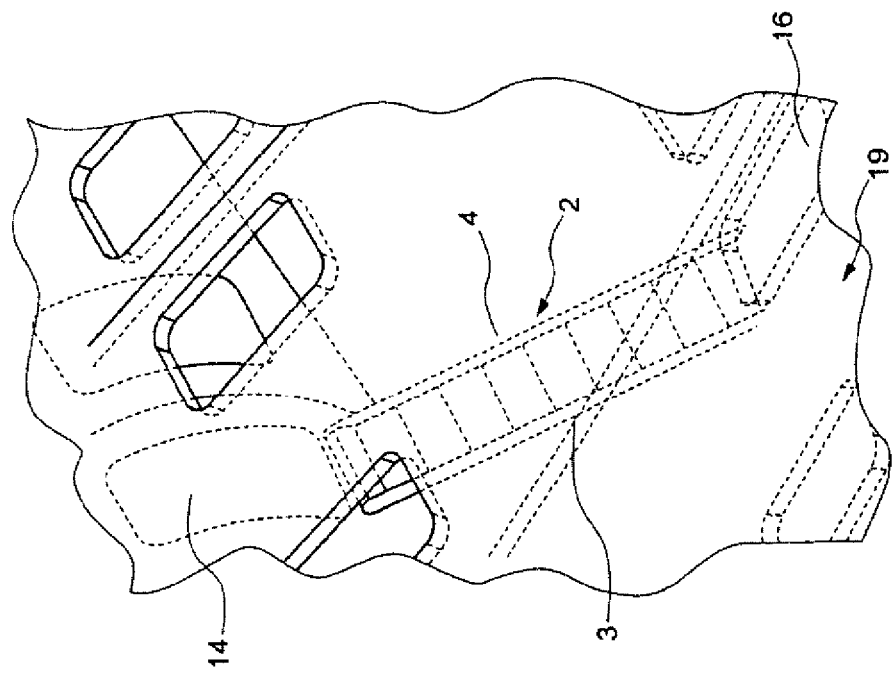
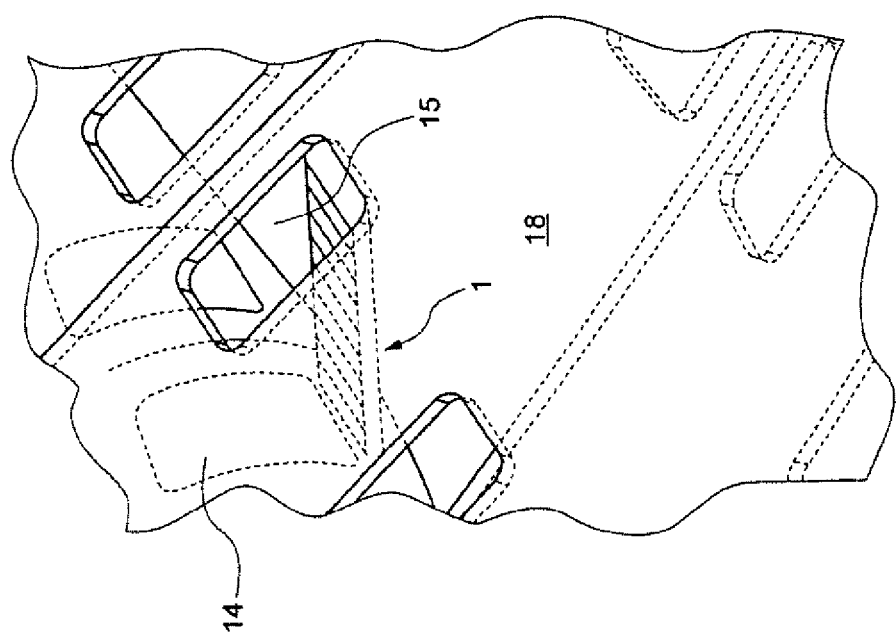

3, 4

3, 4

EMERGENCY EVACUATION SYSTEM, IN PARTICULAR FOR A TAILLESS AEROPLANE

The present application claims the priority of the German patent application No. 10 2005 044 535.7, filed on Sep. 17, 2005, the content of which is incorporated herein by reference.

The invention relates to a device for the emergency evacuation of persons from a first level selectively to a second level that is situated above the first level, or to a third level that is situated below the first level, as required according to the precharacterising portion of claim 1.

The state of the art relates to commercial aircraft comprising a more or less cylindrical pressurised cabin that is closed off from the environment by means of passenger doors. For evacuation purposes, proof must be furnished that within 90 seconds the passengers can get from the aircraft to the outside through the opened doors of one aircraft side by way of evacuation slides.

In the case of an emergency landing on water, ideally the aircraft remains afloat for a defined period of time as a result of the volume available underneath the passenger cabin, such that the bottom edges of the emergency exits are above the surface of the water. During this period of time it is possible to leave the aircraft by way of the evacuation slides, or to effect a transfer to lifeboats or life rafts.

Hitherto known solutions do not provide emergency exit path options towards the top or the bottom because in conventional configurations there has not been any necessity for this.

As far as emergency evacuation is concerned there is a significant difference between the known conventional commercial aircraft and unconventional blended wing-body aircraft, also known as tail-less aircraft, provided according to more recent designs, in that in the case of blended wing-body aircraft the majority of emergency evacuation doors or hatches that are to be provided do not afford any direct access from the passenger cabin to the outside world because for structural reasons it is not possible to sensibly design the entire wing volume as a pressurised cabin.

It is the object of the invention to provide an improved emergency evacuation device. In particular, a device for the emergency evacuation of persons from a first level selectively to a second level situated above the first level, or to a third level situated below the first level is to be created, which device is designed so as to be simple and space saving.

This object is met by a device with the characteristics of claim 1.

Advantageous improvements and embodiments of the device according to the invention are stated in the subordinate claims.

The invention provides a device for the emergency evacuation of persons from a first level selectively to a second level situated above the first level, or to a third level situated below the first level, wherein the device for evacuation to the top level comprises an arrangement in the form of stairs. According to the invention, one end of the device is connected to the first level, while the other end is displaceable between the top level and the bottom level or vice versa, and for evacuation to the bottom level the device is changeable to assume the shape of a slide.

According to a preferred embodiment of the invention, one end of the device at a base point is rotatably held in an articulated manner to the first level, while the other end is pivotable between the top level and the bottom level or vice versa.

According to a preferred embodiment of the invention, the device comprises stringers that are located at opposite longitudinal sides, as well as step elements arranged between the stringers, wherein the step elements for evacuation to the top level comprise an arrangement in the form of stairs, and wherein for evacuation to the bottom level the device between the stringers can be changed to the form of a slide.

According to a preferred embodiment of the invention, in each case the step elements are designed so that their configuration is changeable, wherein the slide provided for evacuation to the bottom level is formed by changing its configuration as by means of the step elements.

According to an advantageous embodiment, in each case the step elements comprise steps and risers that are held so as to be movable in relation to each other and movable in relation to the stringers, and that, for the purpose of forming the slide, can be changed from the configuration of steps to a configuration forming a closed smooth surface.

To this effect, for the purpose of compensating longitudinal differences that occur during a change from the configuration of the steps to the configuration of the closed smooth surface, preferably the length of the stringers is variable.

According to one embodiment of the invention, for the purpose of changing their length the stringers comprise several telescopically interacting elements.

According to another embodiment of the invention, for the purpose of changing their length the stringers are designed so as to be scissor-like.

The steps and risers can be interconnected by hinge joints and can be held in slideways so as to be movable in relation to the stringers.

The steps and risers can be interconnected by hinge joints and can be held in rotary joints so as to be movable in relation to the stringers.

According to another advantageous embodiment of the invention, the step elements in each case only comprise steps that are held so as to be movable in relation to the stringers, and that for forming the slide of the configuration of steps can be changed to a configuration that forms a closed smooth surface.

According to an advantageous embodiment of the invention, by means of a locking device the device is locked to the one level, and, after the locking device has been undone, is displaceable from the one level to the other level.

To this effect it is preferably, in particular, provided for the device to be coupled to a braking- or damping device that hinders its displacement movement, and/or to a balance device, in particular a spring-loaded or gas-pressure-loaded balance device that counteracts the intrinsic weight of the device, and after the locking device has been undone is displaceable from the one level to the other level.

According to an advantageous embodiment of the invention, the device is locked to the top level by means of a locking device, and after the locking device has been undone is displaceable from the top level to the bottom level.

In this arrangement it can preferably, in particular, be provided for the device, after the locking device has been undone, to be displaceable from the top level to the bottom level by its intrinsic weight.

According to an advantageous embodiment of the invention, after the locking device has been undone, the device is displaceable from the one level to the other level by spring force or by means of a hydraulic or pneumatic actuation device.

According to a particularly advantageous embodiment of the invention, the device is provided for the emergency evacuation of persons from a deck that forms the first level, in particular the passenger deck of a blended wing-body aircraft selectively to the top, which top forms the second, top level of the blended wing-body aircraft, or to the bottom, which bottom forms the third, bottom level of the blended wing-body aircraft, wherein the one end of the device is connected to the deck, while the other end is selectively displaceable between the top and the bottom or vice versa.

In this arrangement it can preferably in particular be provided for the device to be arranged in the non-pressurised wing structure of the blended wing-body aircraft, and for said device to be accessible by a hatch provided in the pressure wall of the cabin, and to selectively form an evacuation path from the deck to a top exit hatch provided on the top of the blended wing-body aircraft or to a bottom exit hatch provided on the bottom of the blended wing-body aircraft.

According to an advantageous improvement of the invention, on the bottom exit hatch an inflatable further slide that continues downwards the slide of the device is provided.

Below, an exemplary embodiment of the invention is explained with reference to the drawing.

Figure 2:
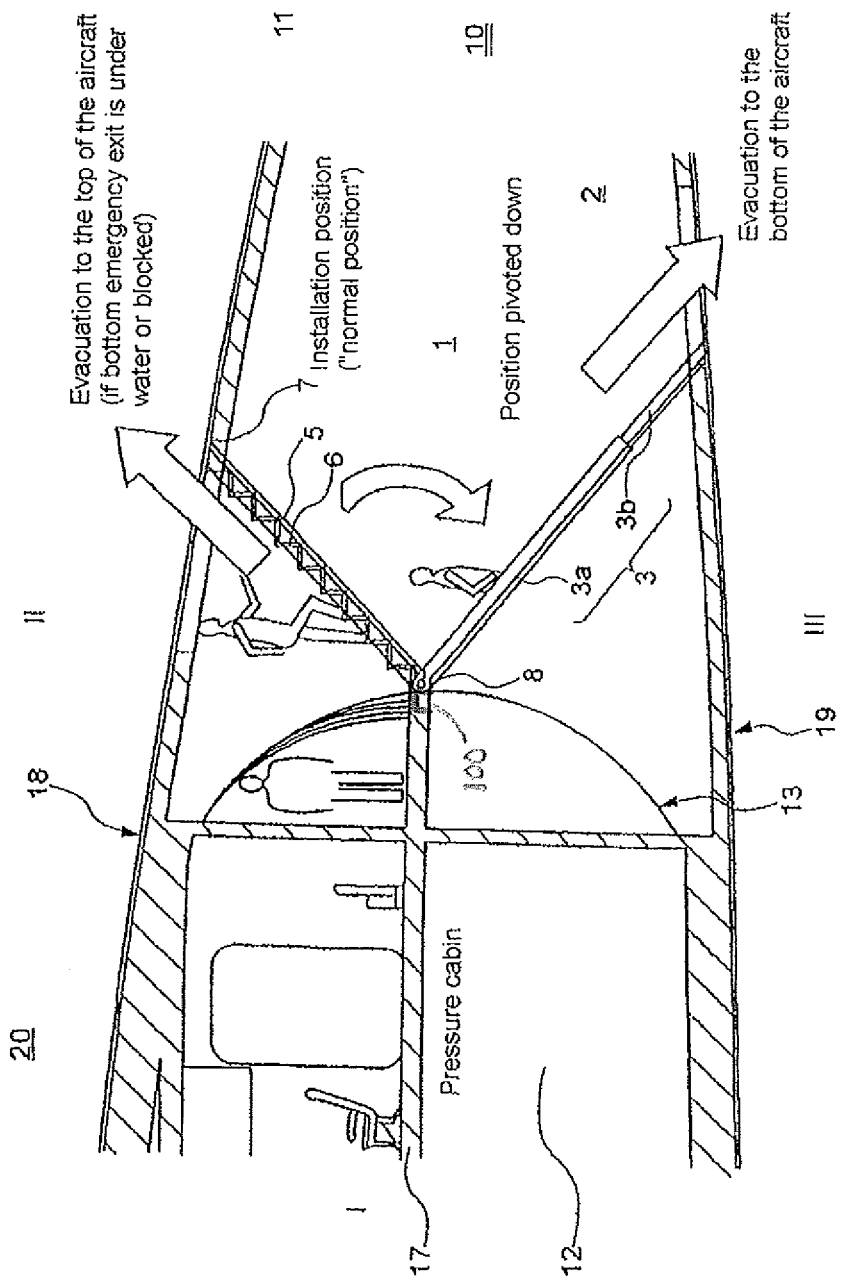

The following are shown:

FIG. 1 a diagrammatic view of the pressurised cabin integrated in the mid-wing region, in a blended wing-body commercial aircraft with adjoining non-pressurised wing regions (transparent);

FIG. 2 a diagrammatic view of an emergency evacuation device according to an exemplary embodiment of the invention, which evacuation device combines of stair function and slide function;

FIGS. 3a) and b) spatially perspective views of the emergency evacuation device according to the invention (as an example relating to a door on the rear of the blended wing-body aircraft shown in FIG. 1) in the "normal position" as stairs, FIG. 3a); and hinged down, as a rigid slide, FIG. 3b).

Figure 4A:
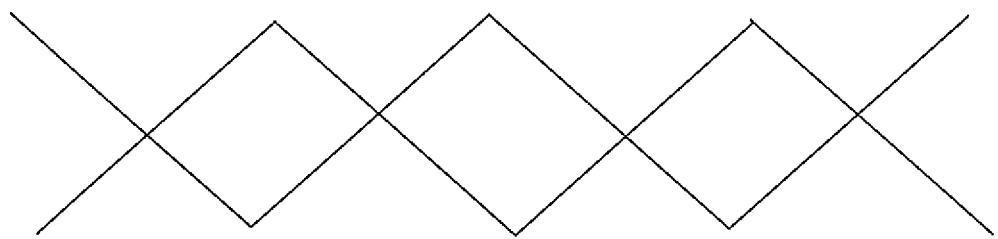
Figure 4B:
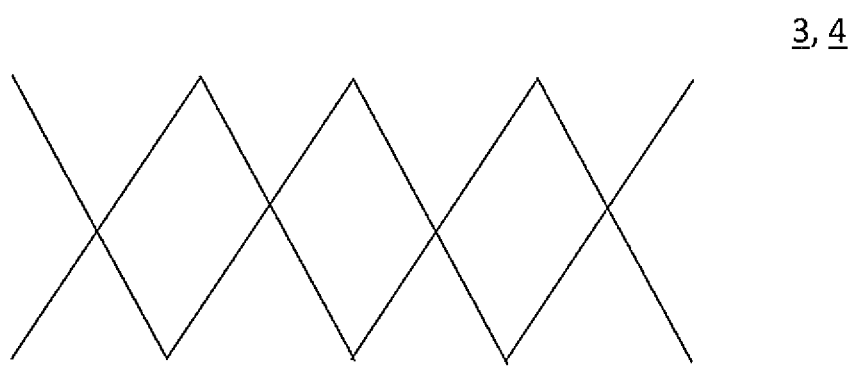

FIGS. 4a and 4b schematically illustrate the scissor-like design for the stringers in an extended position and a retracted position, respectively, according to an embodiment of the invention.

Figure 5A:
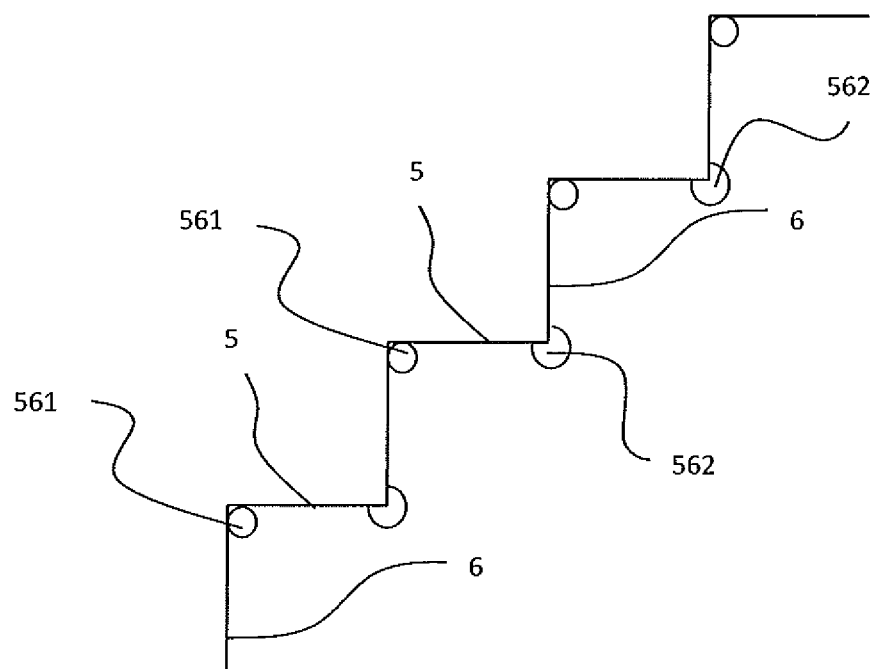

FIG. 5a schematically illustrates the steps and the risers interconnected by hinge joints, according to an embodiment of the invention.

Figure 5B:
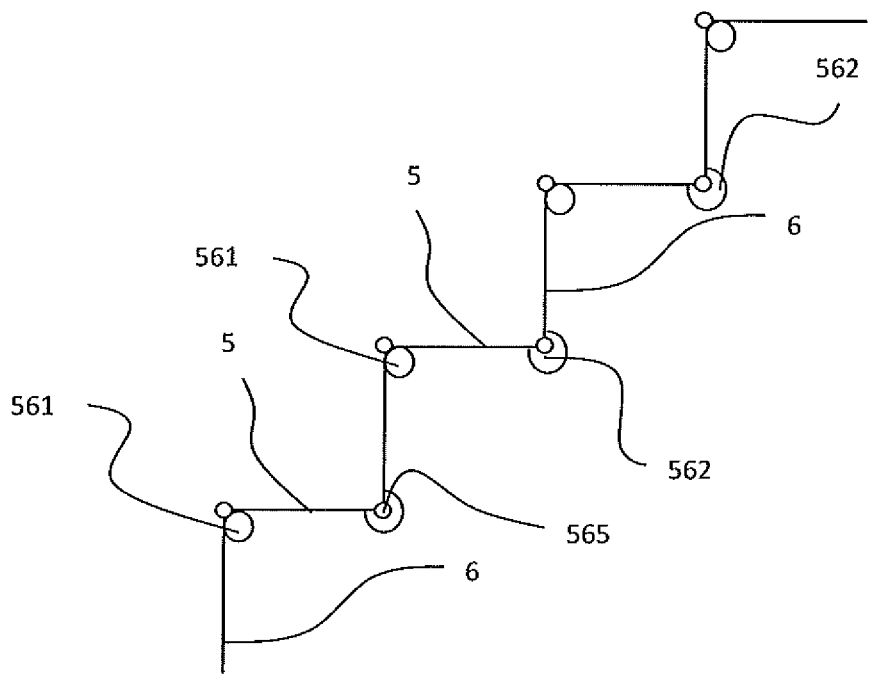

FIG. 5b schematically illustrates the steps and the risers interconnected by hinge joints and connected to the stringers by rotary joints, according to an embodiment of the invention.

FIG. 1 diagrammatically shows a pressurised cabin 12 integrated in the central wing 11 of a blended wing-body aircraft 20. As shown in the diagram, only the doors 12a at the front of the cabin 12 allow direct access to the outside. In contrast to this, on the sides and in the rear region the non-pressurised wing structure 11 follows on from the pressure walls 13 of the cabin 12, which pressure walls are of spherical shape in the diagram. To ensure sufficient emergency evacuation capacity, for each emergency exit position in the cabin 12 additional emergency exit doors or emergency exit hatches are thus to be provided in these regions, namely top exit hatches 15 and bottom exit hatches 16 to the outside in the exterior skin of the aircraft 20.

Since in the case of an emergency landing on water significant parts of the underside of the wing 11 (and thus also of the bottom exit doors 16) are below the water line, safe exit from the aircraft can only be ensured by exits at the top of the wing. Over land, too, in certain damage situations (e.g. damaged undercarriage etc.) a situation may arise in which leaving the aircraft 20 by way of slides through the downward-pointing emergency exit hatches 16 in the non-pressurised wing sections beside and behind the cabin is no longer possible. This requires the availability of corresponding stairs to the top.

FIG. 2 shows a diagrammatic view of an emergency evacuation device according to an exemplary embodiment of the invention, wherein an aircraft cross-section with the emergency evacuation device according to the invention is shown, which device selectively provides a stair function 1 to the top and a slide function 2 to the bottom. The device also comprises stairs 1 that at their base point 8 are held in an articulated manner and at their top 18 comprise a locking device 7 at a landing, which locking device 7 can quickly be undone if required.

The emergency evacuation device 10 of the exemplary embodiment shown thus serves for the emergency evacuation of persons from a deck, in particular a passenger deck 17 of the blended wing-body aircraft 20, which forms a first level I, selectively to the top 18 of the blended wing-body aircraft 20, which top 18 forms a second, top level II, or the bottom 19 of the blended wing-body aircraft 20, which bottom forms a third, bottom level III. One end of the emergency evacuation device 10 is connected to the deck 7 while the other end is selectively displaceable between the top 18 and the bottom 19 (or vice versa).

The emergency evacuation device 10 is arranged in the non-pressurised wing structure 11 of the blended wing-body aircraft 20 and is accessible by way of a hatch 14 provided in the pressure wall 13 of the cabin 12 and selectively provides an evacuation path from the deck 17 to the top exit hatch 15 provided at the top 18 of the aircraft 20, or to the exit hatch 16 provided on the bottom 19 of said aircraft 20.

The emergency evacuation device 10 comprises stringers 3, 4 arranged on opposite longitudinal sides, and step elements 5, 6 arranged between the stringers, wherein the step elements 5, 6 for evacuation to the top level II comprise an arrangement in the form of stairs 1, and wherein for evacuation to the bottom level III the device 1 between the stringers 3, 4 is changeable to assume the shape of a slide 2. In the exemplary embodiment presently described the step elements 5, 6 are designed so as to be changeable in configuration, wherein the slide 2 provided for evacuation to the bottom level III is formed by a change in its configuration by the step elements 5, 6. In each case the step elements 5, 6 comprise steps 5 and risers 6 that are held so as to be movable in relation to each other and movable in relation to the stringers 3, 4 and that can be changed to form the slide 2 from the configuration of steps to a closed configuration that forms a smooth surface. In order to compensate for the differences in length that occur when the configuration of the steps 5, 6 is changed to the configuration forming the closed smooth surface, the length of the stringers 3, 4 is variable, with the stringers 3, 4 comprising several telescopically interacting elements 3a, 3b, 4a, 4b. The steps 5 and risers 6 are interconnected by hinge joints 561, 562 (see FIG. 5a) and are held in slideways so as to be movable in relation to the stringers 3, 4.

As an alternative, the stringers 3, 4 can have a scissor-like design (see FIGS. 4a and 4b) in order to change their length, and the steps 5 and risers 6 can be held in rotary joints 565 (see FIG. 5b) so as to be movable in relation to the stringers 3, 4.

According to yet another alternative embodiment, in each case the step elements could comprise only steps 5 that are held so as to be movable in relation to the stringers 3, 4 and that can be changed for forming the slide 2 from the configuration of steps to a configuration forming a closed smooth surface. The stringers 3, 4 could then be of fixed length.

The emergency evacuation device 10 is coupled to a braking- or damping device that hinders its displacement movement, or to a balance device (not shown) that counteracts its intrinsic weight, in particular a spring-loaded or gas-pressure-loaded balance device, and by means of a locking device 7 is locked to the top level II and, after the locking device 7 has been undone, is pivotable from the top level II to the bottom level III.

Pivoting of the emergency evacuation device 10, after the locking device 7 has been undone, from the top level II to the bottom level III takes place by its intrinsic weight, by spring force or by a hydraulic or pneumatic actuation device or by a combination thereof.

On the bottom exit hatch 16 in addition an inflatable further slide that continues downwards the slide 2 formed by the emergency evacuation device 10 can be provided.

In this way a system is created that combines both the function of stairs 1 to a higher-level platform, and the function of an emergency slide 2 to a lower level.

The left side of FIG. 3a) shows an exemplary view from the top rear onto the stairs 1 leading behind the cabin 12 to the top 18 of the non-pressurised middle segment of the wing 11.

FIG. 3b) illustrates the emergency evacuation device 10 according to the invention at the same position in its hinged-down state, now leading as a rigid emergency slide 2 to the corresponding door 16 at the bottom 19 of the non-pressurised wing region behind the cabin 12. The installation and the functional principle in the non-pressurised wing regions laterally beside the cabin 12 are analogous.

The invention creates a new stairs/slide evacuation system that supports emergency evacuation both to a level II above the passenger plane I, and to a level III below said passenger plane I, as is required for emergency landing on water or for emergency landing of non-conventional blended wing-body aircraft, but that up to now has not yet been implemented in a commercial aircraft.

The invention provides a further advantage in that on each of the existing passenger doors such a system can be installed, which in the case of emergency unequivocally and unmistakably leads to the top or to the bottom.

Separation of known stair function and slide function, as implemented in currently existing multi-deck configurations (B747 or A380), in unconventional aircraft of the type described would require at least double the number of fixed construction elements for each emergency exit position. The invention thus provides a considerable weight advantage with optimum use of the available installation space while at the same time providing enhanced safety.

The stairs 1, which in the normal position are locked to the top level II, when unlocked provide a stable slide 2 that does not first require inflating with compressed air in order to achieve adequate stiffness, as is the case in emergency slides in use at present.

Of course, further fields of application of the invention that in an exemplary manner has been described with reference to a blended wing-body aircraft 20 are also imaginable. For example, the use e.g. in emergency services (fire brigade), on ships or in emergency exits of residential buildings, hotels, towers etc. is also possible.

Additionally, it is to be noted that "comprising" does not exclude the provision of further elements for steps and "a" or "an" does not exclude the provision of the multiplicity of elements. Further, it is to be noted that the features or steps being described with reference with one of the above mentioned embodiments can also be applied in combination with other features or steps of other above described embodiments. Reference signs in the claims are not to be interpreted as limiting.

LIST OF REFERENCE CHARACTERS

1 Stairs
2 Slide
3 Stringer
3a, 3b Stringer element
4 Stringer
4a, 4b Stringer element
5 Step element, step
6 Step element, riser
7 Locking device
8 Base point
10 Emergency evacuation device
11 Wing structure
12 Cabin
12a Cabin door
13 Pressure wall
14 Hatch
15 Top exit hatch
16 Bottom exit hatch
17 Passenger deck
18 Top
19 Bottom
20 Blended wing-body aircraft

The invention claimed is:

1. A device for the emergency evacuation of persons in an aircraft from a first level of the aircraft, the first level comprising a passenger deck selectively to a second level of the aircraft situated above the first level and comprising a top of the aircraft, or to a third level of the aircraft situated below the first level and comprising a bottom of the aircraft,
   wherein the device for evacuation to the second level comprises an arrangement in the form of stairs,
   wherein one end of the device is connected to the first level, while the other end is displaceable between the second level and the third level or vice versa, and
   wherein, for evacuation to the third level, the device is changeable to assume a slide configuration.

2. The emergency evacuation device of claim 1, wherein one end of the device is connected at a base point, so as to be rotatably held in an articulated manner, to the first level, while the other end is pivotable between the second level and the third level or vice versa.

3. The emergency evacuation device of claim 2, wherein the device comprises first and second stringers located at opposite longitudinal sides, and a plurality of step elements arranged between the stringers,
   wherein the plurality of step elements for evacuation to the second level comprise an arrangement in the form of stairs, and
   wherein for evacuation to the third level the device between the stringers are configured to be changed to the form of a slide.

4. The emergency evacuation device of claim 3, wherein each of the step elements is configured so that the configuration thereof is changeable,
   wherein a change in the configuration of the step elements forms the slide for evacuation to the third level.

5. The emergency evacuation device of claim 4, wherein each of the step elements comprises a step and a riser held so as to be movable in relation to each other and movable in relation to the first and second stringers, said step and riser configured to change from a first configuration of the steps to a second configuration forming of a closed smooth surface therebetween for forming the slide.

6. The emergency evacuation device of claim 5, wherein, for the purpose of compensating longitudinal differences that occur during a change from the configuration of the steps to the configuration of the closed smooth surface, the length of the stringers is variable.

7. The emergency evacuation device of claim 6, wherein for the purpose of changing their length, the first and second stringers comprise a plurality of telescopically interacting elements.

8. The emergency evacuation device of claim 6, wherein for the purpose of changing the lengths, the first and second stringers are configured to be scissor-like.

9. The emergency evacuation device of claim 5, wherein the steps and risers are interconnected by hinge joints and are held in slideways so as to be movable in relation to the stringers.

10. The emergency evacuation device of claim 8, wherein the steps and risers are interconnected by hinge joints and are held in rotary joints so as to be movable in relation to the stringers.

11. The emergency evacuation device of claim 4, wherein the step elements in each case comprise a step held so as to be movable in relation to the stringers, and that, for forming the slide, configured to be changed from a first configuration of steps to a second configuration forming a closed smooth surface therebetween.

12. The emergency evacuation device of claim 11, wherein the stringers are of fixed length.

13. The emergency evacuation device of claim 1, further comprising a locking device to lock the device to the second level, wherein, after the locking device has been undone, the device is displaceable from the second level to the third level.

14. The emergency evacuation device of claim 13, further comprising a braking- or damping device coupled to the device and configured to hinder the displacement movement of the device, or a balance device, configured to counteract the intrinsic weight of the device, wherein after the locking device has been undone, the device is displaceable from the second level to the third level.

15. The emergency evacuation device of claim 13, wherein the device is configured to be locked to the second level by the locking device, wherein, after the locking device has been undone, the device is displaceable from the second level to the third level.

16. The emergency evacuation device of claim 15, wherein, after the locking device has been undone, the device is displaceable from the second level to the third level by its intrinsic weight.

17. The emergency evacuation device of claim 13, wherein, after the locking device has been undone, the device is displaceable from the second level to the third level by spring force or by a hydraulic or pneumatic actuation device.

18. The emergency evacuation device of claim 1, wherein the device is configured for the emergency evacuation of persons from the passenger deck forming the first level, of a blended wing-body aircraft, selectively to the second level of the blended wing-body aircraft, or to the third level of the blended wing-body aircraft, wherein one end of the device is connected to the deck, while the other end is selectively displaceable between the second level and the third level or vice versa.

19. The emergency evacuation device of claim 18, wherein the device arranged in the non-pressurised wing structure of the blended wing-body aircraft and is accessible by a hatch provided in a pressure wall of a cabin, and selectively forms an evacuation path from the deck to a top exit hatch provided on the second level of the blended wing-body aircraft, or to a bottom exit hatch provided on the third level of the blended wing-body aircraft.

20. The emergency evacuation device of claim 19, further comprising an inflatable slide on the bottom exit hatch, said inflatable slide continuing downwards relative to the slide of the device.

\* \* \* \* \*